United States Patent [19]

Haas et al.

[11] 3,933,608

[45] Jan. 20, 1976

[54] METHOD FOR THE DECOMPOSITION OF HYDROGEN SULFIDE

[75] Inventors: Larry A. Haas, Burnsville; Sanaa E. Khalafalla, Minneapolis; Carl F. Anderson, Roseville, all of Minn.

[73] Assignee: The United States of America as represented by the Secretary of the Interior, Washington, D.C.

[22] Filed: Aug. 27, 1974

[21] Appl. No.: 501,002

[52] U.S. Cl. ............... 204/164; 423/220; 423/242; 423/567; 423/573 G
[51] Int. Cl.² .................. C01B 17/02; B01K 1/00
[58] Field of Search ....... 423/573 G, 242, 220, 567; 204/164 US, 164

[56] References Cited
UNITED STATES PATENTS

| | | | |
|---|---|---|---|
| 1,957,253 | 5/1934 | Eymann | 423/220 X |
| 3,533,732 | 10/1970 | Moore et al. | 423/573 X |
| 3,783,116 | 1/1974 | Haas et al. | 204/164 |

FOREIGN PATENTS OR APPLICATIONS

| | | | |
|---|---|---|---|
| 374,485 | 6/1932 | United Kingdom | 204/164 |
| 14,413 | 7/1965 | Japan | 20/164 |

*Primary Examiner*—F. C. Edmundson
*Attorney, Agent, or Firm*—William S. Brown; Donald R. Fraser

[57] ABSTRACT

Hydrogen sulfide is decomposed to elemental sulfur in an electrical discharge. In one embodiment of the invention the $H_2S$ decomposition rate is substantially increased when the decomposition is effected in the presence of polymeric chlorotrifluoroethylene.

8 Claims, 2 Drawing Figures

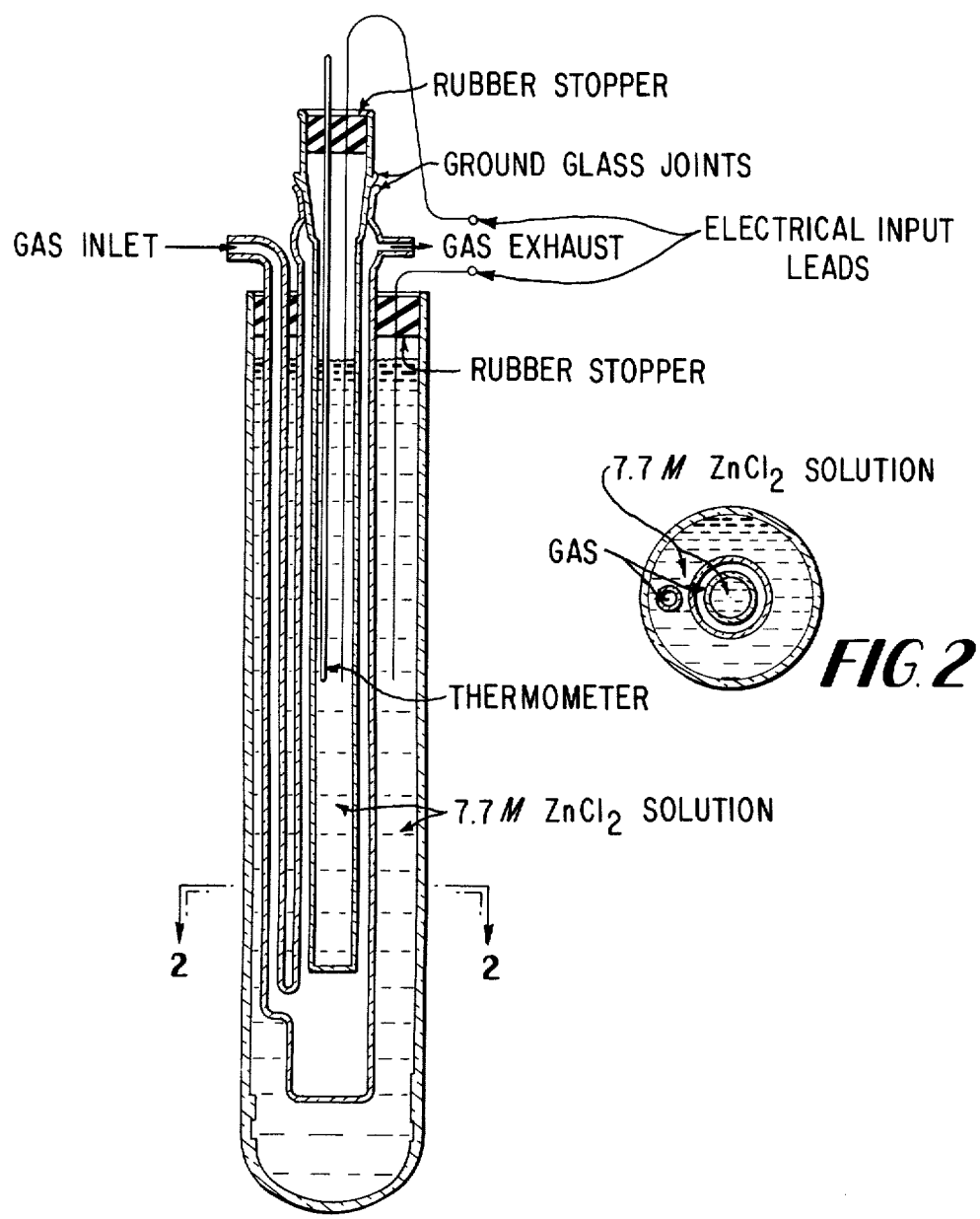

METHOD FOR THE DECOMPOSITION OF HYDROGEN SULFIDE

BACKGROUND OF THE INVENTION

1. Field of the Invention

This invention relates to the decomposition of hydrogen sulfide. More particularly, the invention relates to the decomposition of hydrogen sulfide in an electrical discharge.

2. Description of the Prior Art

Hydrogen sulfide is one of the most toxic of gases, even more harmful than phosgene and cyanide gases. It is also very corrosive and responsible for the rapid deterioration of equipment. Industrially, hydrogen sulfide is emitted by $SO_2$ and metal sulfide reduction plants, oil refineries, natural gas producers, coking furnaces, kraft papermills, tanneries, and chemical plants manufacturing sulfur-containing compounds.

In view of these harmful effects of hydrogen sulfide there has been concerted efforts directed toward increasing the removal efficiencies of hydrogen sulfide to avoid secondary pollution, regardless of the economics involved. It is known, for example, that hydrogen sulfide can be removed with aqueous alkaline solutions, non-aqueous organic amines and dry basic oxides. The sorption of hydrogen sulfide on a solid or a liquid, however, is only a temporary solution since the hydrogen sulfide sorbent must be regenerated for use. These regeneration techniques usually involve multistep operations including the steps of stripping the hydrogen sulfide with wet or dry heat, followed by the partial oxidation of the hydrogen sulfide to $SO_2$ which is then converted to sulfur by, for instance, the Claus process or the Townsend process. If the Claus process (solid catalyst) is used in the catalytic reduction step, the hot sulfur vapor is difficult to condense while in the Townsend process (liquid catalyst) the colloidal sulfur is difficult to reclaim from the liquid.

It has also been known that hydrogen sulfide can be decomposed to hydrogen and sulfur with ultraviolet light radiation or by heat (e.g., above 500° C) or by electrolysis in an electrolyte. All of these techniques are not without their shortcomings, however, and involve either cumbersome procedures, less than desirable yields or decomposition products other than sulfur and hydrogen. Methods depending on oxidation of hydrogen sulfide, for instance, produce water rather than the more economically valuable hydrogen.

SUMMARY OF THE INVENTION

One object of the invention, therefore, is to provide a onestep process for the decomposition of hydrogen sulfide directly into hydrogen and elemental sulfur.

Another object of the invention is to provide a onestep process for converting hydrogen sulfide to non-toxic products at atmospheric pressure and at low temperatures such as ambient temperatures.

Yet another object of the invention is to reduce atmospheric pollution by reducing the concentration of hydrogen sulfide in industrial gas by-products containing same while simultaneously producing hydrogen and elemental sulfur.

These and other objects of the invention are obtained by exposing a gas containing hydrogen sulfide to a silent electrical discharge obtained by a voltage sufficient to effect decomposition of the hydrogen sulfide to hydrogen and elemental sulfur.

The silent electrical discharge or cold plasma discharge as it is commonly called is a high voltage, alternating current discharge. It may be produced by any of the known conventional cold plasma discharge reactors of the art as, for example, the ozonizers. The ozonizers are generally of two types; the concentric tube type and the plate type. In the concentric tube type the gas to be reacted passes through the annular space formed by the concentric tubes, said annular space being usually about 1 – 6 mm across, that is, between the two tubes. One of the tubes must be made of a dielectric material, usually glass, and the other may be either glass or a metal which does not catalyze reaction or decomposition of the desired products. The internal surface of the inner tube and the external surface of the outer tube when made of glass, are in contact with an electrical conductor such as an electrically conducting solution, an electrical conductor such as metal foil or an electrically conducting paint. These conductors act as electrodes. A high voltage is then applied across the electrodes to create the silent electrical discharge.

In the plate type ozonizer the gas is passed through a constant gap of 1 – 6 mm between parallel plates. At least one dielectric plate must be present in each space between high voltage and grounded surfaces to prevent arcing across the electrodes. The required voltage is impressed on flat electrodes which may be metal plates or metal foil or glass.

In the process of the invention the silent electrical discharge through which the hydrogen sulfide or hydrogen sulfide-containing gas is passed is derived by applying to the electrodes a voltage sufficient to effect decomposition of the $H_2S$. This "threshold voltage" at which decomposition of $H_2S$ occurs will vary usually from about 1 to 3 kv, depending principally upon the electrode-gap width, and the voltage which can be applied in the process of the invention can range up to 50 kv or higher, if desired. It has been determined that in general increasing the applied voltage increases both the conversion and the yields. The particular voltage applied for optimum conversion and yield will depend also on the particular diluent utilized or other constituents present in the gas composition. Ordinarily, the threshold voltage is lower with monoatomic gas diluents such as argon and helium than with diatomic gases such as nitrogen and hydrogen.

The gas exposed to the silent electrical discharge according to the invention may be the hydrogen sulfide alone or a gas composition containing hydrogen sulfide as a constituent. Advantageously an inert diluent such as argon, helium or nitrogen is utilized. Higher conversions are usually obtained with the heavier inert gas molecules such as those of argon than with the lower molecular weight gas diluents such as nitrogen and helium. When the gas composition subjected to decomposition in accordance with the invention is one containing inert diluents, the concentration of hydrogen sulfide can be about 0.25 to 10% by volume. The process of the invention also contemplates the exposure of hydrogen sulfide containing gases which are the result of an industrial process such as those aforementioned, either as the principal $H_2S$ abating operation or as a secondary removal operation, that is, on the last remnants of hydrogen sulfide that usually escape the primary $H_2S$ removal methods be they electrical, catalytic or scrubbing techniques.

Exposure of the hydrogen sulfide-containing gas may be effected at a temperature of −40°C up to 61°C or more. The cooler the temperature, the greater the hydrogen sulfide conversion and rate of decomposition. The preferred exposure temperatures therefore fall in the range of about −41°C to 25°C and in most instances room or ambient temperature will be found to provide the desired yields.

The decomposition of the hydrogen sulfide in accordance with the method of the invention may be conducted at atmospheric pressure but elevated pressures may be utilized if desired. In general the rate of decomposition is found to increase with the increase in gas pressure.

In a preferred embodiment of the present invention the decomposition of the hydrogen sulfide is carried out in the presence of polychlorotrifluoroethylene oil, referred to as CFE. When CFE is present in the electrical discharge zone during the decomposition, hydrogen sulfide conversions of over 90% can be achieved. The reason for the substantial increase in hydrogen sulfide conversion is not completely understood but it is believed that the CFE molecules assist in quenching the intermediate or metastable product species, thereby preventing their recombination.

The invention will be further illustrated by reference to the following examples. In the examples, the concentric tube reactor herein referred to as an ozonizer, shown in the accompanying drawing was employed. FIG. 1 of the drawing is a longitudinal view in section of the ozonizer and FIG. 2 is a cross-section of FIG. 1 taken along lines A—A. Electrical contact to the tubes (Vycor) was made by the use of a 7.7 molar $ZnCl_2$ solution. The reactor had a removable inner electrode, which permitted both the insertion of different diameter inner electrodes and the removal of solid products from the reactor. Electrical power was supplied to the reactor with a step-up transformer. The primary power supplied to the transformer was measured with a wattmeter and the secondary power was determined by measuring the area of the oscilloscope trace produced by the ozonizer's voltage and current. The applied root-mean-square (rms) voltage to the ozonizer was measured with high voltage probe and a high-impedance voltmeter. Chemically pure gases were metered from compressed cylinders into a mixing chamber by means of low-flow needle valves. Pressures less than 1 atm were obtained by evacuating the ozonizer with a mechanical pump. After the desired reactant concentration and flow rate were obtained, the discharge was initiated and the degree of reaction was determined.

The integral decomposition rate or space-time yield, R, in micromoles per cubic centimeter per minute, was determined by analyzing the inlet and exhaust gases with a gas chromatograph. If the inlet percentage, $v/v$, of $H_2S$ is $c_i$ and its exhaust is $c_e$, then the balancing of this material across the reactor leads to $$R = \frac{f(c_i - c_e)}{2.2414\, V_d},$$

where $f$ is the total gas flow in cubic centimeters per minute and $V_d$ is electrical discharge volume in cubic centimeters. The fractional conversion, $x$, of $H_2S$ is defined as $$x = \left(\frac{c_i - c_e}{c_i}\right),$$

hence $$R = \frac{xfc_i}{2.2414\, V_d} = \frac{xf_{H_2S}}{V_d},$$

where $f_{H_2S}$ is the $H_2S$ mass flow rate in micromoles per minute.

The integral decomposition rate was calculated as the product of the $H_2S$ mass flow rate in micromoles per minute times its fractional conversion divided by the reactor volume in cubic centimeters. The residence-time, $\tau$, of the gas was calculated as the ratio of the reactor electrical discharge volume, $V_d$, to the volumetric gas flow, $f$, expressed in cubic centimeters per minute.

EXAMPLE I

Hydrogen sulfide mixed with helium was passed through the ozonizer of the drawing and the gas was exposed to a silent electrical discharge in an annular region formed by the two concentric glass tubes of the ozonizer. The electrode gap was varied by fixing the outside electrode at 28cm and varying the inner electrode. Electrical power was supplied to the reactor with a 17 kv Jefferson transformer. The results are shown in Table 1 below.

Table 1

| | | | | Effect of electrode gap and total gas flow on the $H_2S$ conversion Concentration $H_2S$, percent | | | | | |
|---|---|---|---|---|---|---|---|---|---|
| Flow (f), cm³/min | Gap, mm | Electrical discharge volume, cm³ | Residence time, min | Inlet, $c_i$ | Exhaust, $c_e$ | Removed, $c_r$ | Fractional conversion, $x$ | R, micromoles per cm³ per min | Primary power, watts |
| 133 | 1.0 | 32 | 0.241 | 3.13 | 2.87–2.92 | 0.21–.26 | 0.07–.08 | 0.39–0.48 | 7.3 |
| 302 | 1.0 | 32 | .106 | 3.13 | 3.01–3.06 | .07–.12 | .02–.04 | .29–.50 | 7.3 |
| 498 | 1.0 | 32 | .064 | 3.13 | 3.07–3.11 | .02–.06 | .01–.02 | .14–.41 | 7.3 |
| 646 | 1.0 | 32 | .050 | 3.13 | 3.06–3.08 | .05–.07 | .02–.02 | .45–.63 | 7.3 |
| 888 | 1.0 | 32 | .036 | 3.13 | 3.07–3.10 | .03–.06 | .01–.02 | .37–.74 | 7.3 |
| 52 | 2.0 | 57 | 1.096 | 3.13 | 0.64–0.92 | 2.21–2.49 | .70–.72 | .90–1.00 | 7.0 |
| 74 | 2.0 | 57 | .770 | 3.13 | 1.43–1.57 | 1.56–1.70 | .50–.54 | .90–0.99 | 7.0 |
| 120 | 2.0 | 57 | .475 | 3.13 | 2.06–2.10 | .90–1.07 | .29–.34 | .84–1.01 | 7.0 |
| 236 | 2.0 | 57 | .242 | 3.13 | 2.68–2.69 | .44–.45 | .14–.14 | .81–0.83 | 7.0 |
| 395 | 2.0 | 57 | .144 | 3.13 | 2.76–2.80 | .33–.37 | .11–.12 | 1.02–1.14 | 7.0 |
| 487 | 2.0 | 57 | .117 | 3.13 | 2.86–2.89 | .24–.27 | .08–.09 | .91–1.03 | 7.0 |
| 602 | 2.0 | 57 | .092 | 3.13 | 2.87–3.00 | .18–.26 | .06–.08 | .84–1.02 | 7.0 |
| 800 | 2.0 | 57 | .071 | 3.13 | 2.96–3.00 | .13–.17 | .04–.05 | .81–1.06 | 7.0 |
| 919 | 2.0 | 57 | .062 | 3.13 | 2.95–3.02 | .11–.18 | .04–.06 | .79–1.29 | 7.0 |
| 1177 | 2.0 | 57 | .048 | 3.13 | 3.00–3.04 | .09–.13 | .03–.04 | .83–1.19 | 7.0 |
| 60 | 3.5 | 89 | 1.483 | 3.13 | 1.13–1.42 | 1.71–2.00 | .55–.64 | .51–.60 | 7.0 |
| 142 | 3.5 | 89 | .627 | 3.13 | 2.33–2.41 | .72–.80 | .23–.26 | .51–.57 | 7.0 |
| 360 | 3.5 | 89 | .248 | 3.13 | 2.83–2.84 | .29–.30 | .09–.10 | .52–.54 | 7.0 |
| 1078 | 3.5 | 89 | .83 | 3.13 | 3.00–3.03 | .10–.13 | .03–.04 | .54–.70 | 7.0 |
| 130 | 5.5 | 116 | 0.892 | 3.00 | 1.87–1.91 | 1.09–1.13 | 0.36–0.37 | 0.54–0.56 | 5.1 |

Table 1-continued

Effect of electrode gap and total gas flow on the $H_2S$ conversion

| Flow (f), cm³/min | Gap, mm | Electrical discharge volume, cm³ | Residence time, min | Concentration $H_2S$, percent | | | Fractional conversion, x | R, micromoles per cm³ per min | Primary power, watts |
|---|---|---|---|---|---|---|---|---|---|
| | | | | Inlet, $c_i$ | Exhaust, $c_e$ | Removed, $c_r$ | | | |
| 232  | 5.5 | 116 | .500 | 3.00 | 2.36-2.37 | .63-0.64 | .21-.21 | .56-.57 | 5.1 |
| 360  | 5.5 | 116 | .322 | 3.00 | 2.57-2.58 | .42-.43  | .14-.14 | .58-.59 | 5.1 |
| 455  | 5.5 | 116 | .255 | 3.00 | 2.64-2.67 | .33-.36  | .11-.12 | .58-.63 | 5.1 |
| 565  | 5.5 | 116 | .205 | 3.00 | 2.71-2.73 | .27-.29  | .09-.10 | .59-.63 | 5.1 |
| 1364 | 5.5 | 116 | .087 | 3.00 | 2.86-2.88 | .11-.14  | .04-.05 | .56-.72 | 5.1 |
| 2197 | 5.5 | 116 | .053 | 3.00 | 2.89-2.93 | .07-.11  | .02-.04 | .59-.93 | 5.1 |

The above results were obtained at the following experimental conditions: applied voltage = 14 kv, gas temperature = 25° C, and helium gas diluent.

The data in Table 1 shows that the conversion decreases as the gas flow rate increases but essentially no changes occurs in the reaction yield. The highest reaction rate occurred at a 2 mm electrode gap whereas the maximum power consumption of the transformer occurred at 1 mm.

EXAMPLE II

In this example the effect of the reactant ($H_2S$) concention was determined utilizing a 5.5 mm electrode gap in the reactor at a nominal gas flow of 0.50 liter per minute (STP). The results of the study are shown in Table 2 below.

The data of Table 2 demonstrate that the $H_2S$ conversion was greatest at the lowest $H_2S$ inlet concentration. However, the reaction yield was highest at about 3 percent $H_2S$. The data also shows that the power consumption increased directly with the $H_2S$ inlet concentration.

EXAMPLE III

In this example the effect of the gas temperature in the range of −41°C to 61°C on the fractional $H_2S$ conversion and reaction yield was evaluated. The conditions for the decomposition and results are summarized in Table 3 below.

Table 3.

Experimental data for the $H_2S$ decomposition in a discharge at various temperatures

| Temp. °C | Flow, (f), cm³/min | $H_2S$ concentration, percent | | | Fractional conversion, $(c_r/c_i)$, x | R, Micromoles per cm³ per min |
|---|---|---|---|---|---|---|
| | | Inlet, $c_i$ | Exhaust, $c_e$ | Removed, $c_r$ | | |
| −41.0 | 481 | 2.89 | 2.59 | 0.30 | 0.104 | 0.555 |
| 6.0   | 503 | 2.89 | 2.65 | .24  | .083  | .464 |
| 18.7  | 493 | 2.89 | 2.65 | .24  | .083  | .409 |
| 19.9  | 493 | 2.89 | 2.62 | .27  | .093  | .512 |
| 20.0  | 493 | 2.89 | 2.66 | .23  | .080  | .436 |
| 58.0  | 494 | 2.89 | 2.69 | .20  | .069  | .380 |
| 59.0  | 494 | 2.89 | 2.68 | .21  | .073  | .399 |
| 60.0  | 494 | 2.89 | 2.69 | .20  | .069  | .380 |
| 61.0  | 494 | 2.89 | 2.69 | .20  | .069  | .380 |

The above results were obtained at the following experimental conditions: electrode gap = 5.5 mm, applied voltage = 17 kv, primary power = 5.2 watt, electrical discharge volume = 116 cm³ and helium gas diluent.

Table 2.

Effect of inlet H S gas concentration on reaction rate

| $H_2S$ analyses, percent | | | Conversion $(c_r/c_i)$, x | R, micromoles per cm³ per min | Primary power, watt |
|---|---|---|---|---|---|
| Inlet, $c_i$ | Exhaust, $c_e$ | Removed, $c_r$ | | | |
| 0.33  | 0.25  | 0.08 | 0.242 | 0.154 | 5.0 |
| 1.11  | 0.94  | 0.17 | 0.153 | 0.326 | 5.1 |
| 1.80  | 1.56  | 0.24 | 0.133 | 0.461 | 5.4 |
| 2.57  | 2.34  | 0.23 | 0.089 | 0.441 | 5.5 |
| 3.35  | 3.09  | 0.26 | 0.078 | 0.499 | 5.8 |
| 4.13  | 3.88  | 0.25 | 0.060 | 0.480 | 6.0 |
| 7.20  | 7.02  | 0.18 | 0.025 | 0.336 | 7.0 |
| 10.43 | 10.35 | 0.08 | 0.008 | 0.149 | 7.5 |

The above results were obtained at the following experimental conditions: electrode gap = 5.5 mm; applied voltage = 14 kv; electrical discharge volume = 116 cm³; gas temperature = 25°C; gas flow = 0.50 liter per minute; and helium gas diluent.

The data of Table 3 shows that the conversion and yield both increase as the temperature decreases. Lower gas temperatures, therefore, are preferred for the decomposition of $H_2S$.

EXAMPLE IV

In this example the dependence of the $H_2S$ decomposition yield on the applied voltage was studied at a gas temperature of 25°C. The other conditions employed in the decomposition and the results obtained are summarized in Table 4 below.

Table 4.

Experimental data obtained at various applied voltages and gas diluents

| Applied voltage, kv | Primary power, watts | $H_2S$ analysis, percent | | | Fractional conversion $(c_r/c_i)$, x | R, micromoles per cm³ per min |
|---|---|---|---|---|---|---|
| | | Inlet, $c_i$ | Exhaust, $c_e$ | Removed, $c_r$ | | |
| (HYDROGEN DILUENT) | | | | | | |
| 6  | 0   | 2.89 | 2.93 | 0    | 0    | 0 |
| 7  | 1.8 | 2.87 | 2.84 | 0.03 | 0.01 | 0.056 |
| 11 | 5.4 | 2.87 | 2.79 | .08  | .03  | .149 |

Table 4.-continued

| Applied voltage, kv | Primary power, watts | Experimental data obtained at various applied voltages and gas diluents | | | Fractional conversion $(c_r/c_i)$, × | R, micromoles per $cm^3$ per min |
|---|---|---|---|---|---|---|
| | | $H_2S$ analysis, percent | | | | |
| | | Inlet, $c_i$ | Exhaust, $c_e$ | Removed, $c_r$ | | |
| 14 | 8.4 | 2.87 | 2.76 | .11 | .04 | .205 |
| 16 | 11.4 | 2.89 | 2.77 | .12 | .04 | .224 |
| (HELIUM DILUENT) | | | | | | |
| 1 | 0.2 | 3.13 | 3.13 | 0 | 0 | 0 |
| 2 | .5 | 3.13 | 3.12 | 0.01 | <0.01 | 0.019 |
| 4 | 1.9 | 3.13 | 3.06 | .07 | .02 | .136 |
| 7 | 4.0 | 3.13 | 3.01 | .12 | .04 | .233 |
| 10 | 7.0 | 3.13 | 2.92 | .21 | .07 | .408 |
| 10 | 7.0 | 3.13 | 2.93 | .20 | .06 | .388 |
| 21 | 14.0 | 3.13 | 2.88 | .25 | .08 | .486 |
| 21 | 14.0 | 3.13 | 2.85 | .28 | .09 | .544 |
| (NITROGEN DILUENT) | | | | | | |
| 9 | 2.4 | 2.94 | 2.90 | 0.04 | 0.01 | 0.080 |
| 12 | 6.6 | 2.91 | 2.79 | .12 | .04 | .240 |
| 14 | 9.6 | 2.94 | 2.67 | .27 | .09 | .540 |
| 16 | 13.2 | 2.94 | 2.60 | .34 | .12 | .681 |
| 17 | 15.6 | 2.94 | 2.54 | .40 | .14 | .801 |
| 20 | 19.1 | 2.91 | 2.52 | .39 | .13 | .781 |
| 21 | 22.2 | 2.91 | 2.36 | .55 | .19 | 1.101 |
| 21 | 22.2 | 2.93 | 2.35 | .58 | .20 | 1.161 |
| (ARGON DILUENT) | | | | | | |
| 1 | +0 | 2.96 | 2.88 | 0.08 | 0.03 | 0.161 |
| 4 | +0 | 2.96 | 2.82 | .14 | .05 | .282 |
| 6 | 1.2 | 2.91 | 2.71 | .20 | .07 | .400 |
| 7 | 3.0 | 2.94 | 2.67 | .27 | .09 | .544 |
| 8 | 3.6 | 2.91 | 2.59 | .32 | .11 | .645 |
| 12 | 6.0 | 2.94 | 2.48 | .46 | .16 | .927 |
| 14 | 7.8 | 2.90 | 2.41 | .49 | .17 | 1.987 |
| 17 | 10.8 | 2.94 | 2.38 | .56 | .19 | 1.128 |

The above results were obtained at the following experimental conditions: electrode gap = 5.5 mm; gas flow = 0.50 liter per minute; reactor volume = 116 $cm^3$; and gas temperature = 25° C.

The data of Table 4 demonstrates that the conversion and yield increase at applied voltages greater than the threshold value (about 3 kv). The highest conversions below 16 kv were obtained with argon diluent. At 16 kv, the conversion with Ar and $N_2$ were essentially the same. With He and $H_2$, the $H_2S$ conversions were considerably lower.

EXAMPLE V

The effect of the total gas pressure on $H_2S$ decomposition rate was determined at a constant mass-or volumetric-flow. The decomposition conditions and the results obtained are summarized in Table 5.

As can be seen from the data of Table 5 the reaction yield increased with increasing pressure in both cases, i.e., at a constant mass-or volumetric-flow.

EXAMPLE VI

In this example the dependence of the reaction yield on the volume of the electrical discharge zone was determined by filling the predischarge and discharge zone with either dimethylaniline or with polychlorotrifluoroethylene oil. About 20 cc of liquid were required before the liquid reached the inner electrode and this quantity was referred to as predischarged zone. The conditions for the decomposition and the results obtained are reported in Table 6 below.

Table 5.

| Absolute pressure, torr | Primary power, watt | Volumetric flow at operating pressure, $cm^3/min$ | Total mass flow (M), millimoles/min | Residence time, min | Effect of pressure of the $H_2S$ decomposition | | | $H_2S$ conversion, percent | R, micromoles per $cm^3$ per min |
|---|---|---|---|---|---|---|---|---|---|
| | | | | | $H_2S$ Concentration, percent | | | | |
| | | | | | Inlet, $c_i$ | Exhaust, $c_e$ | Removed, $c_r$ | | |
| SECTION A - CONSTANT MASS FLOW AND VARIABLE VOLUMETRIC FLOW | | | | | | | | | |
| 144 | 4.2 | 2640 | 22.3 | 0.025 | 3.00 | 2.87-2.98 | 0.02-0.13 | 0.7-4.3 | 0.038-0.250 |
| 446 | 4.2 | 855 | 22.3 | .136 | 3.00 | 2.80-2.81 | .19-.20 | 6.3-6.7 | .365-.385 |
| 590 | 4.2 | 644 | 22.3 | .180 | 3.00 | 2.72-2.74 | .26-.28 | 8.7-9.3 | .500-.538 |
| 741 | 4.8 | 515 | 22.4 | .225 | 3.00 | 2.67-2.70 | .30-.33 | 10.0-11.0 | .580-.638 |
| 755 | 5.4 | 500 | 22.1 | .232 | 3.00 | 2.68-2.69 | .31-.32 | 10.3-10.7 | .591-.611 |
| 1210 | 6.0 | 308 | 21.9 | .377 | 3.00 | 2.56-2.62 | .38-.44 | 12.7-14.7 | .716-.829 |
| 1417 | 6.0 | 258 | 21.5 | .449 | 3.00 | 2.45-2.55 | .45-.55 | 15.0-18.3 | .834-1.019 |
| SECTION B - CONSTANT VOLUMETRIC FLOW AND VARIABLE MASS FLOW | | | | | | | | | |
| 326 | 6.6 | 510 | 9.8 | 0.227 | 2.89 | 2.42-2.52 | 0.37-0.47 | 12.8-16.3 | 0.312-0.396 |
| 481 | 6.0 | 511 | 14.5 | .227 | 2.89 | 2.51-2.64 | .25-.38 | 8.7-13.1 | .274-.474 |
| 587 | 6.0 | 511 | 17.6 | .227 | 2.89 | 2.60-2.62 | .27-.29 | 9.3-10.0 | .410-.441 |
| 741 | 5.4 | 509 | 22.1 | .228 | 2.89 | 2.65-2.67 | .22-.24 | 7.6-8.3 | .420-.458 |
| 765 | 5.4 | 517 | 23.2 | .223 | 2.89 | 2.67-2.68 | .21-.22 | 7.3-7.6 | .421-.441 |
| 1065 | 5.8 | 517 | 32.3 | .225 | 2.89 | 2.69-2.70 | .19-.20 | 6.6-6.9 | .529-.557 |
| 1205 | 6.0 | 505 | 35.8 | .229 | 2.89 | 2.68-2.70 | .19-.21 | 6.6-7.3 | .586-.648 |
| 1507 | 6.0 | 515 | 45.6 | .225 | 2.89 | 2.70-2.71 | .18-.19 | 6.2-6.6 | .707-.746 |

The above results were obtained at the following experimental conditions: electrode gap = 5.5 mm, applied voltage = 14 kv, gas temperature = 25° C, electrical discharge volume = 116 $cm^3$, and helium gas diluent.

TABLE 6.

Experimental data obtained with a 5.5 mm electrode gap at 14.5 kv with and without dimethylaniline and chlorofluorocarbon oil in the reactor

| Volume, cm³ | | Gas flow (f), | Gas resistance time | $H_2S$ concentration, percent | | | $H_2S$ conversion, | R, micromoles | Primary | R |
|---|---|---|---|---|---|---|---|---|---|---|
| Discharge, $V_d$ | Liquid, $V_l$ | cm³/min | $\left(\frac{V_d}{f}\right)$, minutes | Inlet, $c_i$ | Exhaust, $c_e$ | Removed, $c_r$ | percent | per cm³ per min | power (P), watt | P |
| SECTION A - DIMETHYLANILINE | | | | | | | | | | |
| 126 | None | 154 | 0.818 | 2.99 | 2.36 | 0.68 | 21 | 0.339 | 8.8 | 0.039 |
| 126 | ¹20 | 154 | .818 | 3.15 | 2.69 | .46 | 15 | .248 | 8.8 | .028 |
| 85 | 61 | 150 | .567 | 3.29 | 2.87 | .42 | 13 | .328 | 8.8 | .037 |
| 85 | 61 | 150 | .567 | 3.19 | 2.84 | .35 | 11 | .275 | 8.8 | .031 |
| 41 | 105 | 150 | .273 | 3.19 | 2.92 | .27 | 8 | .441 | 8.8 | .050 |
| 0 | 146 | 147 | .0 | 3.19 | 3.03 | .17 | 5 | — | 8.8 | — |
| SECTION B - CHLOROFLUOROCARBON OIL | | | | | | | | | | |
| 126 | None | 154 | 0.818 | 2.99 | 2.36 | 0.63 | 21 | 0.339 | 8.8 | 0.039 |
| 126 | ¹20 | 153 | .823 | 2.90 | 1.01 | 1.89 | 65 | 1.015 | 16.0 | .064 |
| 108 | 38 | 148 | .730 | 2.90 | 1.22 | 1.68 | 58 | 1.025 | 14.0 | .065 |
| 89 | 57 | 148 | .601 | 2.90 | 1.51 | 1.39 | 48 | 1.032 | 12.0 | .066 |
| 63 | 83 | 148 | .426 | 2.90 | 1.94 | .96 | 33 | 1.003 | 9.5 | .061 |

¹Quantity of liquid required to fill predischarge zone. The above results were obtained at the following experimental conditions: gas temperature = 25° C, gas pressure 760 torr, and helium gas diluent.

The data of Table 6 show that when dimethylaniline (DMA) was added to the predischarge zone, the $H_2S$ conversion decreased. It appeared that the DMA vapor inhibited the $H_2S$ decomposition reaction. As more DMA was added, the $H_2S$ conversion also decreased due to the decrease in the discharge volume ($V_d$) but the quantity of reaction per unit volume remained essentially constant.

When polychlorotrifluoroethylene oil was added to the predischarge zone it was surprisingly found that the $H_2S$ conversion tripled. With addition of the CFE to the discharge zone ($V_d$), the conversion decreased linearly with $V_d$ as is evident by the constant decomposition (R). The wattage increased in the presence of the CFE vapor in the discharge zone but decreased as more CFE liquid was added to the discharge zone. This indicates that the quantity of $H_2S$ decomposed per unit energy is greater when CFE vapor is present.

It is claimed:

1. A method for the decomposition of hydrogen sulfide into elemental sulfur and hydrogen which comprises exposing a gas comprising $H_2S$ to a silent electrical discharge derived from a voltage sufficient to effect said decomposition said decomposition being effected in the presence of polychlorotrifluoroethylene oil vapor.

2. The method of claim 1 wherein the said exposure is at a temperature of −41°C to 30°C.

3. The method of claim 2 wherein the temperature is ambient temperature.

4. The method of claim 1 wherein said gas comprises $H_2S$ and an inert gas diluent.

5. The method of claim 4 wherein the gas diluent is selected from argon, nitrogen and helium.

6. The method of claim 4 wherein the concentration of $H_2S$ in said gas diluent is about .25 to 10% by volume.

7. The method for the decomposition of hydrogen sulfide into hydrogen and elemental sulfur wherein a gas comprising hydrogen sulfide, polychlotrifluoroethylene oil vapor and an inert gas is exposed at a temperature of about −40°C to 61°C to a silent electrical discharge derived from a voltage sufficient to effect said decomposition, the concentration of said hydrogen sulfide in said inert gas ranging from about .25 to 10% by volume.

8. The method of claim 7 wherein said temperature is ambient temperature and the pressure is atmospheric pressure.

* * * * *